April 28, 1964  E. SATTLER ETAL  3,131,231
PROCESS FOR PURIFYING CRUDE BENZENE
Filed Oct. 24, 1957
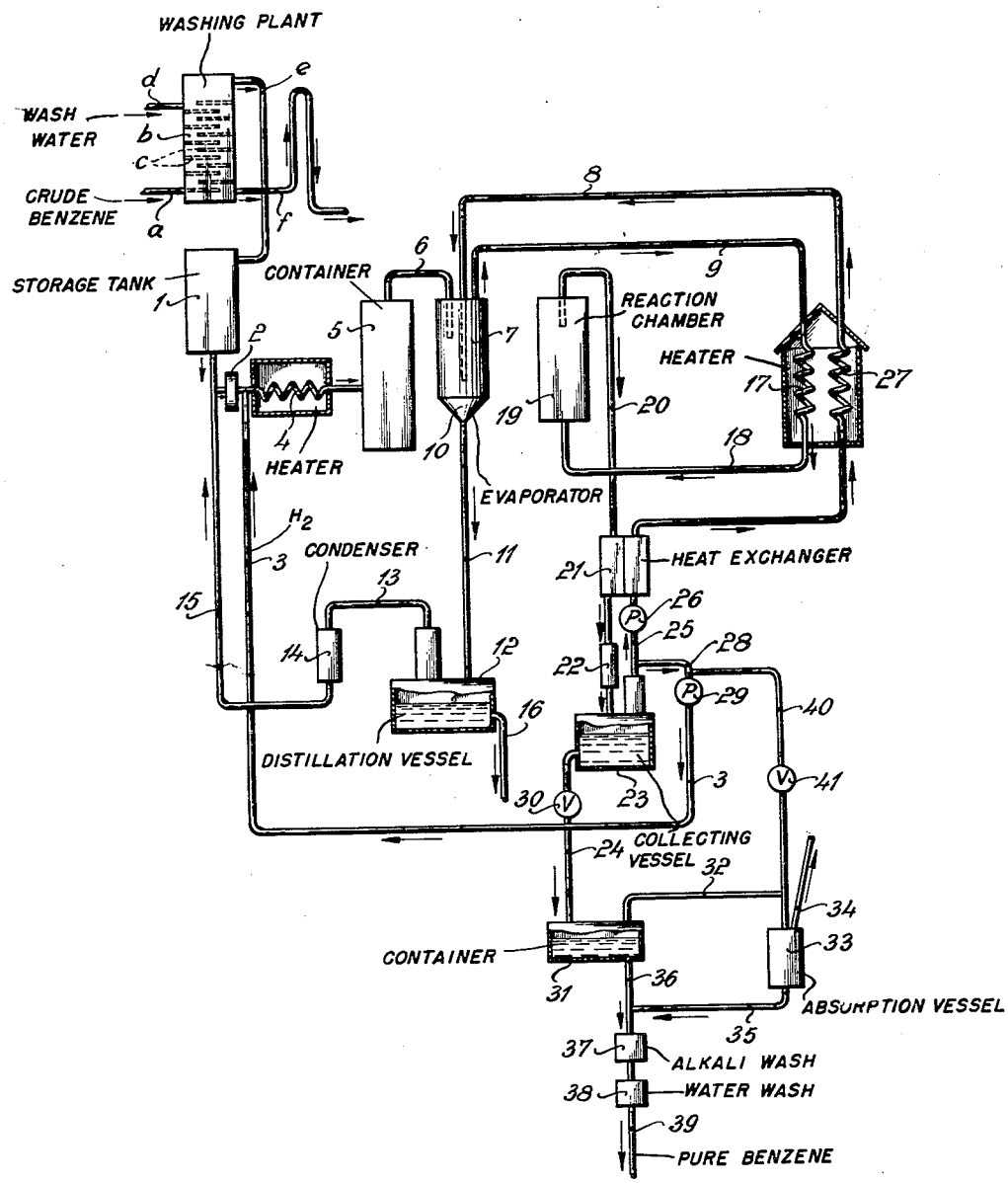
INVENTORS
Emil Sattler
Paul Schmidt
By Cushman, Darby & Cushman
Attorneys

United States Patent Office 3,131,231
Patented Apr. 28, 1964

3,131,231
PROCESS FOR PURIFYING CRUDE BENZENE
Emil Sattler, Essen, and Paul Schmidt, Gelsenkirchen-Buer, Germany (% Cushman, Darby and Cushman, American Security Bldg., 759 15th St. NW., Washington 5, D.C.)
Filed Oct. 24, 1957, Ser. No. 732,755
Claims priority, application Germany Oct. 27, 1956
2 Claims. (Cl. 260—674)

The present invention relates to a process for purifying crude benzene by catalytic treatment of the initial material in the vapour phase at elevated pressure and elevated temperature with hydrogen or a gas containing hydrogen, for example coke-oven gas. Processes of this nature are known under the name of the catalytic pressure refining of crude benzene and are used in large technical plants.

The conversion of the crude benzene into the vapour form is effected in the known processes generally only after the initial material has been subjected to a long-lasting heat treatment under such a high pressure that the material remains liquid, the object being to polymerize certain impurities in the crude benzene, i.e., to convert them into substances of such a high boiling point that these polymerisation products occur as liquid residue in the subsequent evaporation of the material.

Although this previous heat treatment of the initial material does per se substantially facilitate the conduction of the pressure refining process, it has been shown that this does not obviate all possibilities of disruptions in operation. It was in fact found, even if only after a comparatively long operational time, that certain depositions occurred in those devices of the pressure refining plant which followed the evaporators of the crude benzene, and also that corrosion of the apparatus was not completely suppressed.

Closer investigation of these phenomena showed that the reasons therefor are not to be found in the crude benzene itself, but in the water content of the crude benzene, or more accurately stated in the content of certain salts in the water contained in the benzene. In the recovery of the crude benzene from coal distillation gas, the said benzene physically dissolves a certain quantity of water, this quantity being about 370 mg. per litre of crude benzene at for example 15° C. Certain salts of hydrocyanic acid, thiocyanic acid and hydrochloric acid also enter the benzene with this water. With the evaporation of the crude benzene in the pressure refining plant, some of these salts are concurrently evaporated and enter the following parts of the apparatus, where they cause the aforesaid disruptions.

In order to eliminate these disruptions, the invention provides for the crude benzene being brought into direct contact with cold water prior to being condensed and heated to evaporation temperature, for example in a washing plant or any other mixing arrangement. Due to the direct contact with the water, the salt concentration in the benzene is greatly reduced, so that only very small quantities of salts still remain with the dissolved water in the benzene. The aforesaid disruptions then no longer occur in practice or they only occur after such long periods of time that it is no longer possible to refer to a disruption having a deleterious effect on the industrial economy of the plant.

It has been found to be sufficient to use the washing water in a quantity of about 2 to 15%, preferably 5 to 10%, based on crude benzene. If the washing water is used for example in a quantity of 5%, i.e., about 40 g. of water to 800 g. of crude benzene, there is obtained a dilution of the original salt concentration in the crude benzene of about 1:100. The crude benzene washed in this manner therefore still only contains about 1/100 of the original quantity of salt. By this means, however, its water content is raised from about 370 mg. to about 500 mg. per litre of crude benzene. This last-mentioned phenomenon is due to the fact that the dissolving power of the crude benzene for water with a low salt content is greater than for water which contains a certain quantity of salt.

In the apparatus shown in the drawing for carrying the invention into effect continuously, the crude benzene to be produced passes through the pipe $a$ into the bottom of a washing plant $b$, which is for example fitted with perforated partitions $c$ arranged staggered relatively to one another. Water (drinking water) is supplied to the top end of the washing plant through the pipe $d$, so that either water or crude benzene form the continuous phase in the washing plant. Water and benzene come into intimate contact, so that water-soluble fractions of the crude benzene, more especially fractions of salt solution, pass into the washing water. The crude benzene flowing upwardly is thus washed in counter-current with water and flows from the top end of the washing plant $b$ through the pipe $e$ to the storage tank 1. The benzene entering the latter is substantially free from inorganic impurities.

The washing water charged with the impurities discharges from the bottom of the washing plant $b$ through the pipeline $f$.

From the storage tank 1, the washed crude benzene is conveyed by means of a pump 2 at such a pressure into the following apparatus that the reactions can take place at a pressure of 20 to 200 atmospheres, more especially 50 to 100 atmospheres.

Beyond the pump 2, the crude benzene is mixed with a small quantity of hydrogen from the pipeline 3. The mixture then enters the heater 4, in which it is heated to a temperature between 180 and 300° C., preferably to a temperature of 200 to 250° C. The heated material then passes into a container 5 which is of such dimensions and so designed that the material remains therein for about 30 minutes to 2 hours without any substantial change in the temperature.

The material thereafter flows through the pipeline 6 into the evaporator vessel 7, into which steam heated to about 350° C. is introduced through the pipeline 8. Evaporation occurs in the vessel 7 as a result of the further supply of heat. The evaporated substances discharge through the pipeline 9, while a high-boiling fraction collects in the preferably conical base portion 10 of the evaporator 7. This residue still contains a certain quantity of low-boiling substances so that it remains sufficiently liquid. It is withdrawn through the pipeline 11 into a distillation vessel 12, in which the constituents of lower boiling point are distilled off. The vapours escaping through the pipeline 13 are condensed in the condenser 14 and added to the initial material again by way of the pipeline 15.

The pitch-like residue collecting in the distillation vessel 12 can be removed in liquid form through the pipeline 16.

The mixture of hydrogen and hydrocarbons in vapour form which escapes from the evaporator 7 passes through a gas-heated heater 17, in which the temperature is raised to about 340° C. It then passes through the pipeline 18 into the reaction chamber 19, in which it is brought in the vapour phase into intimate contact with known catalysts, for example the oxides or sulphides of the 5th, 6th and 8th groups, if necessary arranged on carriers. The gases and vapours discharge from the reaction chamber 19 by way of the pipeline 20 and pass into a heat exchanger 21 and from thence into a condenser 22, where the hydrocarbons which can be condensed are separated out. The latter are collected in the vessel 23 and can be extracted in liquid form through the pipeline 24 after expansion by way of the valve 30. The gases leave by way of the pipeline 25 and some of them are moved by a pump 26 through the heat exchanger 21 to the gas-heated heater 27, from which they again pass through the pipeline 8 to the evaporator 7.

A partial stream of the gas is forced from the pipeline 28 by the pump 29 into the pipeline 3 in order to be mixed with the initial material before entering the heater 4.

The purified benzene or the like drawn off through the pipeline 24 is separated in the container 31 from the gases dissolved thereon, which gases pass through the pipe 32 to an absorption vessel 33 in which the last residues of the hydrocarbon oils are retained. The gases are finally led off through the pipe 34 to be used for other purposes, for example as heating gas for the heaters 17 and 27.

From the absorption vessel 33, the hydrocarbon oil separated out therein passes through the pipe 35 to the discharge pipe 36 of the vessel 31. The hydrocarbon oil thereafter passes into the alkali washing plant 37 and finally into the water-washing plant 38, from which it is extracted at 39 in pure form.

Some of the gas is continuously or intermittently drawn off from the gas cycle by way of the pipeline 40 and the expansion device 41 into the absorption vessel in order to keep the hydrogen concentration in the cycle at a favourable value.

Fresh hydrogen is introduced at a suitable point into the system, for example into the pipeline 25.

When processing crude benzene, the process is for example carried out as follows:

8 tons of washed crude benzene are continuously heated every hour under a pressure of 100 atmospheres to 230° C. in the heater 4 together with 300 cubic metres of coke-oven gas (about 50% $H_2$). The heated material remains in the vessel 5 for about 45 minutes at a substantially constant temperature. It then discharges continuously into the evaporator 7, into which 13,000 cubic metres of coke-oven gas or circulation gas which has been heated to 350° in the heater 27 are introduced every hour at a suitable pressure.

The impurities of high molecular weight formed by polymerisation are extracted at the bottom of the evaporator, which impurities may amount to about 0.5%, based on the initial material, after distilling off the light-boiling substances which are entrained therewith. This pitch-like fraction is then withdrawn through the pipeline 16.

The mixture of benzene vapour and hydrogen is heated to about 340° C. in the heater 17. A molybdic acid-zinc oxide catalyst or a molybdic acid-alumina catalyst is used in the reaction chamber 19.

After the benzene condensed in the condenser 22 has been relieved of pressure and after the gases dissolved therein have been separated, this benzene is also washed with a weak alkali solution for the purpose of removing any hydrogen sulphide which is still present and finally it is washed with water.

The benzene being obtained at 39 contains less than 1% of non-aromatic fractions. A benzene with a very high degree of purity is obtained with a high yield of up to 99%. The bromine number of this crude benzene is lower than 0.2, the sulphuric acid test is below 0.1 and the sulphur content is practically nil.

A distinction is made between two types of aqueous salt solutions contained in the crude benzene:

(1) Salt solution dissolved in the crude benzene,
(2) Salt solution emulsified in the oil.

If the emulsion consisting of oil and salt solution is not stable, the salt solution fraction can be removed by allowing it to stand for about one hour, if necessary at a temperature of 90–150° C. and/or pressures of 3.5 to 17.5 atm. gauge. By this means, about 75% of the salts are separated out.

The salt solutions forming a stable emulsion can be combined in various ways, for example Electrically by adding de-mineralised water in an electric field of 16,000–30,000 volts,
Chemically, for example by adding fatty acids which are perhaps saponified with $NH_3$, Na-petroleum sulphonates, by water-soluble solvents, such as for example dilute alcohols, naphthacresol or by $Na_2SO_4$, $Na_2S$.

The utility of the various means is dependent on their pH value. In certain cases, the effect of these means can be improved by 0.3% NaOH.

The residue content of salt solution in the crude benzene after decanting and breaking the emulsion is removed by washing with water.

Example for a two-stage washing:
  Input oil—
    5.7 mg. NaCl/100 g.
    0.2% by weight $H_2O$.
  After the first washing stage—
    1.3 mg. NaCl/100 g.
    0.9% by weight $H_2O$.
  After the second washing stage—
    less than 1 mg. NaCl/100 g.
    0.6% by weight $H_2O$.
  Total water consumption: 7.4 m.$^3$/h.
  Oil throughput, 62 tons/hour.

By "crude benzene" within the terms of the invention, there are understood unpurified hydrocarbon oils or hydrocarbon oil mixtures containing aromatic substances, especially those which are obtained in the distillation of coal as a secondary product under the name of "light oil."

We claim:

1. A process for purifying crude benzene containing a small amount of water and water soluble inorganic salts of a member of the group consisting of hydrocyanic, thiocyanic and hydrochloric acids comprising washing the crude benzene in the liquid state with water, the quantity of water being about 2 to 15% based on crude benzene, separating the crude benzene from the wash water, then heating the separated benzene to an elevated temperature at a pressure sufficient to maintain the benzene liquid in order to condense polymerisable impurities, evaporating the vaporizable components of the benzene and catalytically treated the benzene vapours with hydrogen at elevated temperature and pressure.

2. The process of claim 1 wherein the water is used in a quantity of about 5–10% based on crude benzene.

References Cited in the file of this patent

UNITED STATES PATENTS

| | | |
|---|---|---|
| 1,984,903 | Wagner | Dec. 18, 1934 |
| 2,440,311 | Tiddy | Apr. 28, 1948 |
| 2,662,062 | Sumerford | Dec. 8, 1953 |
| 2,701,267 | Urban et al. | Feb. 1, 1955 |
| 2,728,714 | Winkler et al. | Dec. 27, 1955 |
| 2,772,212 | Seyfried | Nov. 27, 1956 |
| 2,825,678 | Jahnig et al. | Mar. 4, 1958 |

FOREIGN PATENTS

| | | |
|---|---|---|
| 345,738 | Great Britain | Apr. 2, 1931 |